(12) United States Patent
Misumi et al.

(10) Patent No.: US 9,683,072 B2
(45) Date of Patent: *Jun. 20, 2017

(54) EPOXY RESIN COMPOSITION, PREPREG, AND CARBON-FIBER-REINFORCED COMPOSITE MATERIAL

(71) Applicant: TORAY INDUSTRIES, INC., Tokyo (JP)

(72) Inventors: Jun Misumi, Iyo-gun (JP); Nobuyuki Arai, Iyo-gun (JP); Hiroshi Taiko, Otsu (JP); Shizue Ueno, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 31 days.

This patent is subject to a terminal disclaimer.

(21) Appl. No.: 14/650,027

(22) PCT Filed: Oct. 31, 2013

(86) PCT No.: PCT/JP2013/079609
§ 371 (c)(1),
(2) Date: Jun. 5, 2015

(87) PCT Pub. No.: WO2014/112180
PCT Pub. Date: Jul. 24, 2014

(65) Prior Publication Data
US 2015/0315331 A1    Nov. 5, 2015

(30) Foreign Application Priority Data
Jan. 15, 2013 (JP) ................................ 2013-004347

(51) Int. Cl.
| | |
|---|---|
| B32B 27/04 | (2006.01) |
| B32B 27/12 | (2006.01) |
| B32B 27/18 | (2006.01) |
| B32B 27/38 | (2006.01) |
| C08G 59/32 | (2006.01) |
| C08G 59/38 | (2006.01) |
| C08G 59/50 | (2006.01) |
| C08L 63/00 | (2006.01) |
| C08G 59/28 | (2006.01) |
| C08G 59/22 | (2006.01) |
| C08G 59/24 | (2006.01) |
| C08J 5/04 | (2006.01) |

(Continued)

(52) U.S. Cl.
CPC ............ *C08G 59/28* (2013.01); *C08G 59/10* (2013.01); *C08G 59/226* (2013.01); *C08G 59/245* (2013.01); *C08G 59/38* (2013.01); *C08G 59/504* (2013.01); *C08G 59/5033* (2013.01); *C08G 59/54* (2013.01); *C08J 5/042* (2013.01); *C08J 5/24* (2013.01); *C08L 63/00* (2013.01); *C08J 2363/00* (2013.01); *C08J 2363/02* (2013.01)

(58) Field of Classification Search
None
See application file for complete search history.

(56) References Cited

U.S. PATENT DOCUMENTS 5,458,929 A * 10/1995 Earls ..................... C08G 59/18
428/1.53
6,596,373 B1    7/2003 Kishi et al.
(Continued)

FOREIGN PATENT DOCUMENTS

JP    2001-323046 A    11/2001
JP    2011-79983 A    4/2011
(Continued)

OTHER PUBLICATIONS

International Search Report, issued in PCT/JP2013/079609, dated Nov. 26, 2013.

*Primary Examiner* — Michael J Feely
(74) *Attorney, Agent, or Firm* — Birch, Stewart, Kolasch & Birch, LLP

(57) ABSTRACT

Provided are: an epoxy resin composition which enables the production of a carbon-fiber-reinforced composite material having excellent tensile strength and compressive strength and suitable as a material for structures; a prepreg; and a carbon-fiber-reinforced composite material. An epoxy resin composition characterized by comprising at least [A] an epoxy resin having a structure represented by formula (1), [B] an epoxy resin having at least one amine-type glycidyl group or at least one ether-type glycidyl group and having a liquid form at 40° C. and [C] a curing agent; and a prepreg and a carbon-fiber-reinforced composite material, each produced using the epoxy resin composition.

(1)

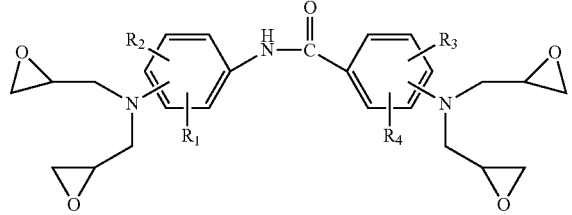

(In the formula, $R_1$ to $R_4$ independently represent at least one atom or group selected from the group consisting of a hydrogen atom, an aliphatic hydrocarbon group having 1 to 4 carbon atoms, an alicyclic hydrocarbon group having 4 or less carbon atoms, and a halogen atom.)

14 Claims, No Drawings

(51) Int. Cl.
*C08J 5/24* (2006.01)
*C08G 59/10* (2006.01)
*C08G 59/54* (2006.01)

(56) References Cited

U.S. PATENT DOCUMENTS

2013/0005855 A1 1/2013 Arai et al.
2015/0210813 A1* 7/2015 Arai .......................... C08J 5/24
 428/298.7

FOREIGN PATENT DOCUMENTS

JP 2011-213870 A 10/2011
WO WO 2011-118106 A1 9/2011

* cited by examiner

EPOXY RESIN COMPOSITION, PREPREG, AND CARBON-FIBER-REINFORCED COMPOSITE MATERIAL

TECHNICAL FIELD

The present invention relates to an epoxy resin composition, prepreg, and carbon fiber reinforced composite material. More specifically, it relates to an epoxy resin composition suitable for producing carbon fiber reinforced composite material that has high tensile strength and high compression strength and serves favorably as structural member and also relates to prepreg and carbon fiber reinforced composite material.

BACKGROUND ART

High in specific strength and specific modulus, carbon fiber reinforced composite materials containing carbon fibers as reinforcing fibers have been used in recent years in manufacturing structural materials for aircraft and automobiles, sporting goods such as tennis rackets, golf shafts, and fishing rods, as well as general industrial applications.

Carbon fiber reinforced composite material can be manufactured by, for example, curing plates of prepreg, that is, a sheet-like intermediate prepared by impregnating reinforcing fiber with uncured matrix resin or curing an intermediate prepared by injecting liquid resin into reinforcing fiber placed in a mold, which is called the resin transfer molding method. Of these production methods, a common prepreg based process includes stacking a plurality of prepreg sheets and then heat and press them to provide carbon fiber reinforced composite material. From the viewpoint of productivity related characteristics including processability, thermosetting resin such as epoxy resin is used frequently as matrix resin for prepreg.

In field of structural materials for aircraft and automobiles, in particular, rigorous characteristics requirements, such as for high tensile strength and compressive strength, have been imposed on carbon fiber reinforced composite materials in recent years as they have come in wider use. However, trade-off relation often exists between tensile strength and compression strength of carbon fiber reinforced composite material, making it very difficult to realize high level of tensile strength and compression strength at the same time.

Effective methods for improving the tensile strength of carbon fiber reinforced composite materials include using reinforcement fiber with higher strength and increasing the volume fraction (Vf) of fiber. Many methods have been proposed so far with the aim of obtaining high-strength reinforcement fibers (see Patent document 1). In general, as the strength of reinforcement fiber is increased, it tends to become more difficult to make effective use of the inherent strength of the fiber, but this proposal contains no statement on strength enhancement that can be achieved by using carbon fiber for reinforcement. It is also known that even if reinforcement fibers with the same level of strength are used, reinforced materials may vary widely in tensile strength utilization rate depending on the matrix resin combined and the conditions used for molding. A large residual thermal stress distortion tends to be left in carbon fiber reinforced composite material, preventing the development of high strength, when it is cured at a temperature above 180° C. Therefore, even if high-strength carbon fibers are obtained, there still remain technical problems to be solved to produce carbon fiber reinforced composite material that maintain the high strength.

It has been shown that a high tensile strength utilization rate can be developed if the tensile rupture elongation and fracture toughness $K_{IC}$ of matrix resin is in a specific relationship (see Patent document 2). However, if a large amount of thermoplastic resin or rubber components are added to the matrix resin with the aim of increasing the fracture toughness $K_{IC}$, the viscosity will increase to cause a deterioration in the processability and handleability in the prepreg production process.

Furthermore, compression strength is also an important characteristic of carbon fiber reinforced composite material when it is used as structural member. The resin compositions disclosed so far as a component for producing carbon fiber reinforced composite material with high compression strength include epoxy resin compositions containing tetraglycidyl diaminodiphenyl methane, bifunctional epoxy resin (such as bisphenol A type epoxy resin and diglycidyl resorcinol), and 3,3'-diaminodiphenyl sulfone (see Patent document 3), epoxy resin compositions containing polyfunctional epoxy resin, a diglycidyl aniline derivative, and 4,4'-diaminodiphenyl sulfone (see Patent document 4), and epoxy resin compositions containing polyfunctional epoxy resin, epoxy resin with a special backbone, and 3,3'-diaminodiphenyl sulfone (see Patent document 5). Although they serve to increase the compression strength, it is still difficult to maintain both compression strength and tensile strength at a high level.

PRIOR ART DOCUMENTS

Patent Documents

Patent document 1: Japanese Unexamined Patent Publication (Kokai) No. HEI 11-241230
Patent document 2: Japanese Unexamined Patent Publication (Kokai) No. HEI 9-235397
Patent document 3: International Publication WO1996/17006
Patent document 4: Japanese Unexamined Patent Publication (Kokai) No. 2003-26768
Patent document 5: Japanese Unexamined Patent Publication (Kokai) No. 2002-363253

SUMMARY OF THE INVENTION

Problems to be Solved by the Invention

Thus, an object of the present invention is to provide an epoxy resin composition suitable for producing carbon fiber reinforced composite material that has high tensile strength and high compression strength and serves favorably as structural member and also provide prepreg and carbon fiber reinforced composite material.

Means of Solving the Problems

The present invention adopts one or more of the following constitutions to meet the above object. Specifically, the invention aims to provide an epoxy resin composition including at least the following components [A], [B], and [C]:

[A] epoxy resin having a structure as represented by formula (1),

[Chemical formula 1]

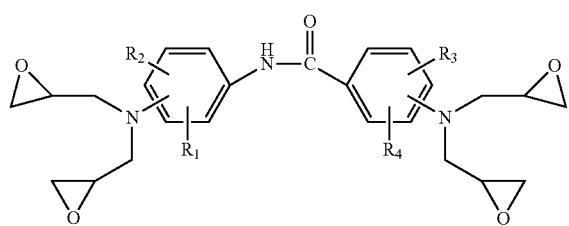

(In the formula, $R_1$ to $R_4$ represent at least one selected from the group consisting of a hydrogen atom, aliphatic hydrocarbon group containing 1 to 4 carbon atoms, alicyclic hydrocarbon group containing 4 or less carbon atoms, and halogen atom.)

[B] epoxy resin having at least one amine type glycidyl group or ether type glycidyl group and being liquid at 40° C.

[C] curing agent

The present invention further provides a cured resin produced by curing the epoxy resin composition, carbon fiber reinforced composite material produced by adding carbon fiber, prepreg produced by impregnating carbon fiber with the epoxy resin composition, and carbon fiber reinforced composite material produced by curing the prepreg.

Advantageous Effect of the Invention

The present invention serves to produce an epoxy resin composition that is high in flexural modulus and toughness. Prepreg can be produced by combining this epoxy resin composition with carbon fiber, and carbon fiber reinforced composite material high in tensile strength and compression strength can be produced by curing this prepreg.

DESCRIPTION OF PREFERRED EMBODIMENTS

Described in detail below are the epoxy resin composition, prepreg, and carbon fiber reinforced composite material according to the present invention. As a result of intensive studies on the mechanism of the development of tensile strength and compression strength in carbon fiber reinforced composite material, the inventors found that a structure suitable to maintain both a high tensile strength and a high compression strength, which are commonly in a trade-off relationship, at a high level can be obtained by using an epoxy resin composition that contains epoxy resin [A] as represented by chemical formula (1), epoxy resin [B] having at least one amine type glycidyl group or ether type glycidyl group and being liquid at 40° C., and a curing agent [C].

$R_1$, $R_2$, $R_3$, and $R_4$ in epoxy resin [A] of a structure as represented by chemical formula (1) contained in the epoxy resin composition according to the present invention are independently one selected from the group of a hydrogen atom, aliphatic hydrocarbon group containing 1 to 4 carbon atoms, alicyclic hydrocarbon group containing 4 or less carbon atoms, and they may be identical to or different from each other. If $R_1$, $R_2$, $R_3$, $R_4$ have too large a structure, the epoxy resin composition may be too high in viscosity and low in handleability, or they may be low in compatibility with other components of the epoxy resin composition and fail to serve effectively to improve the strength.

Materials useful as epoxy resin [A] include, for example, tetraglycidyl-4,4'-diaminobenzanilide, tetraglycidyl-4,4'-diamino-3,3,5,5'-tetraethyl benzanilide, tetraglycidyl-4,4'-diamino-3,3,5,5'-tetrabromobenzanilide, tetraglycidyl-3,4'-diaminobenzanilide, tetraglycidyl-3,3'-diaminobenzanilide, tetraglycidyl-4,4'-diamino-2,2'-dimethyl benzanilide, tetraglycidyl-4,4'-diamino-2,3'-dimethyl benzanilide, tetraglycidyl-4,4'-diamino-3,3'-dimethyl benzanilide, tetraglycidyl-3,4'-diamino-5-methyl benzanilide, tetraglycidyl-3,4'-diamino-2'-methyl benzanilide, tetraglycidyl-3,4'-diamino-3'-methyl benzanilide, tetraglycidyl-3,4'-diamino-5,2'-dimethyl benzanilide, tetraglycidyl-3,4'-diamino-5,3'-dimethyl benzanilide, tetraglycidyl-3,3'-diamino-5-methyl benzanilide, and tetraglycidyl-3,3'-diamino-5,5'-dimethyl benzanilide.

In particular, from the viewpoint of the compatibility with other epoxy resins, $R_1$, $R_2$, $R_3$, and $R_4$ are preferably hydrogen atoms and epoxy resin [A] is preferably tetraglycidyl-4,4'-diaminobenzanilide, tetraglycidyl-3,4'-diaminobenzanilide, or tetraglycidyl-3,3'-diaminobenzanilide. From the viewpoint of fire retardance, some portions of $R_1$, $R_2$, $R_3$, and $R_4$ may be replaced with halogen atoms such as Cl and Br as a preferred embodiment.

Materials useful as epoxy resin [A] tend to be solid at room temperature, i.e. 25° C., and if they account for a large proportion, the epoxy resin composition may be too high in viscosity to provide prepreg having required tackiness or drape property. If their content is too small, on the other hand, they sometimes fail to improve the strength sufficiently. Accordingly, the content of epoxy resin [A] is preferably 40 to 90 mass %, more preferably 50 to 90 mass %, of the total quantity of the epoxy resin contained in the epoxy resin composition according to the present invention.

Epoxy resin [B] contained in the epoxy resin composition according to the present invention is an essential component required to control the viscosity of the epoxy resin composition and the tackiness and drape property of the prepreg to be produced. Here, the expression of "being liquid at 40° C." means that the material has a melting point or glass transition temperature of lower than 40° C. as determined according to JIS K7121 (1987) and shows flowability at 40° C. If the content of epoxy resin [B] is too small, the epoxy resin composition may be too high in viscosity to provide prepreg having required tackiness or drape property. If its content is too large, on the other hand, it sometimes fails to improve the strength sufficiently. Accordingly, the content of epoxy resin [B] is preferably 10 to 60 mass % of the total quantity of the epoxy resin contained in the epoxy resin composition according to the present invention.

Materials useful as epoxy resin [B] include, for example, bisphenol A type, bisphenol F type, resorcinol type, diaminodiphenyl methane type, aminophenol type, meta-xylene diamine type, 1,3-bisaminomethyl cyclohexane type, and diglycidyl aniline type epoxy resins. Commercially available products useful as epoxy resin [B] are listed below.

Commercially available products of bisphenol A type epoxy resin include jER (registered trademark) 825 (manufactured by Mitsubishi Chemical Corporation), Epiclon (registered trademark) 850 (manufactured by DIC), and Epotohto (registered trademark) YD-128 (manufactured by Nippon Steel & Sumikin Chemical Co., Ltd.).

Commercial products of bisphenol F type epoxy resin include jER (registered trademark) 806 and jER (registered trademark) 807 (both manufactured by Mitsubishi Chemical Corporation), Epiclon (registered trademark) 830 (manufactured by DIC), and Epotohto (registered trademark) YD-170 (manufactured by Nippon Steel & Sumikin Chemical Co., Ltd.).

Commercial products of resorcinol type epoxy resin include Denacol (registered trademark) EX-201 (manufactured by Nagase ChemteX Corporation).

Commercial products of diaminodiphenyl methane type epoxy resin include ELM434 (manufactured by Sumitomo Chemical Co., Ltd.), Araldite (registered trademark) MY720, Araldite (registered trademark) MY721, Araldite (registered trademark) MY9512, Araldite (registered trademark) MY9663 (all manufactured by Huntsman Advanced Materials Gmbh), and Epotohto (registered trademark) YH-434 (manufactured by Nippon Steel & Sumikin Chemical Co., Ltd.).

Commercial products of meta-xylene diamine type epoxy resin include TETRAD-X (manufactured by Mitsubishi Gas Chemical Co., Inc.). Commercial products of 1,3-bisaminomethyl cyclohexane type epoxy resin include TETRAD-C (manufactured by Mitsubishi Gas Chemical Co., Inc.).

Commercial products of aminophenol type epoxy resin include ELM120 and ELM100 (both manufactured by Sumitomo Chemical Co., Ltd.), jER (registered trademark) 630 (manufactured by Mitsubishi Chemical Corporation), and Araldite (registered trademark) MY0510 and Araldite (registered trademark) MY0600 (both manufactured by Huntsman Advanced Materials Gmbh). Commercial products of diglycidyl aniline type epoxy resin include GAN and GOT (both manufactured by Nippon Kayaku Co., Ltd.) and Toray Epoxy PG-01 (diglycidyl-p-phenoxy aniline, manufactured by Toray Fine Chemicals Co., Ltd.).

Curing agent [C] contained in the epoxy resin composition according to the present invention is a compound having an active group that is reactive with the epoxy group. Examples of the curing agent include, for instance, dicyandiamide, aromatic amine curing agent, aminobenzoic acid ester, various anhydrides, phenol novolac resin, cresol novolac resin, polyphenol compounds, imidazole derivatives, aliphatic amine, tetramethyl guanidine, thiourea-added amine, methyl hexahydrophthalic anhydride, other carboxylic anhydrides, carboxylic acid hydrazide, carboxylic acid amide, polymercaptan, boron trifluoride ethyl amine complex, and other Lewis acid complexes.

In particular, the use of an aromatic amine as the curing agent makes it possible to produce cured epoxy resin with high heat resistance. In particular, among other aromatic amine curing agents, various diaminodiphenyl sulfone isomers and various diaminobenzanilide isomers are suitable as a curing agent to produce cured epoxy resin that has good mechanical characteristics, such as tensile strength and compression strength, as well heat resistance. Of these, various diaminobenzanilide isomers are particularly preferred because they can provide carbon fiber reinforced composite material that is high in both tensile strength and compression strength.

Furthermore, if a combination of dicyandiamide and a urea compound such as 3,4-dichlorophenyl-1,1-dimethylurea, or an imidazole is used as the curing agent, a high heat resistance and water resistance can be achieved even when curing is performed at a relatively low temperature. The use of an acid anhydride to cure epoxy resin provides cured material that has a lower water absorption percentage compared to curing with an amine compound. Other good curing agents include the above ones in latent forms such as microencapsulated ones, which serve to provide prepreg with high storage stability that will not suffer significant changes particularly in tackiness and drape property even if left to stand at room temperature.

The optimum content of a curing agent depends on the type of the epoxy resin and curing agent used. In the case of using an aromatic amine curing agent, for instance, it is preferable that the ratio of the quantity of active hydrogen in the aromatic amine curing agent to that of the quantity of the epoxy group in the epoxy resin be adjusted to about 0.7 to 1.3 because this allows the production of cured epoxy resin having good mechanical characteristics, such as tensile strength and compression strength, as well as heat resistance. These curing agents may be used singly, or a plurality thereof may be used in combination.

Commercial products of aromatic amine curing agents include 4,4'-DABAN and 3,4'-DABAN (both manufactured by Nipponjunryo Chemicals), Seikacure S (manufactured by Wakayama Seika Kogyo Co., Ltd.), MDA-220 (manufactured by Mitsui Chemicals, Inc.), jER Cure (registered trademark) W (manufactured by Mitsubishi Chemical Corporation), 3,3'-DAS (manufactured by Mitsui Chemicals, Inc.), and Lonzacure (registered trademark) M-DEA, Lonzacure (registered trademark) M-DIPA, Lonzacure (registered trademark) M-MIPA, and Lonzacure (registered trademark) DETDA 80 (all manufactured by Lonza).

The composition to be used may contain these epoxy resins and curing agents, part of which may be subjected to a preliminary reaction in advance. In some cases, this method can serve effectively for viscosity adjustment and storage stability improvement.

Here, in regard to the correlation between the mechanical characteristics of carbon fiber reinforced composite material and the mechanical characteristics of cured epoxy resin, it is known that the 0° compression strength of carbon fiber reinforced composite material is in a positive correlation with the flexural modulus of the cured epoxy resin. Furthermore, the 0° tensile strength of carbon fiber reinforced composite material is in a positive correlation with the flexural modulus of cured epoxy resin and in a negative correlation with the rubber-state elastic modulus of cured epoxy resin. In general, when the crosslink density of cured epoxy resin is improved by increasing the flexural modulus, trade-off will occur as the rubber-state elastic modulus increases. Therefore, the development of a high 0° tensile strength requires, as an important factor, a good balance between the flexural modulus of cured epoxy resin and its rubber-state elastic modulus and accordingly, it is preferred to improve the flexural modulus while depressing the increase in crosslink density.

From these points, cured epoxy resin produced by curing the epoxy resin composition according to the present invention at 180° C. for 2 hours preferably has a flexural modulus of 4.5 GPa or more, more preferably 4.7 GPa or more, and still more preferably 4.9 GPa or more, in order to provide carbon fiber reinforced composite material with favorable tensile strength and compression strength.

In addition, the rubber-state elastic modulus is in a positive correlation with the crosslink density of cured epoxy resin while the toughness is in a negative correlation with the crosslink density of cured epoxy resin and accordingly, the rubber-state elastic modulus and the toughness is in a negative correlation. The improvement in resin's toughness is effective for developing a favorable 0° tensile strength, and cured epoxy resin with a sufficiently low crosslink density and a favorable toughness can be obtained when the rubber-state elastic modulus is 23 MPa or less. For the development of carbon fiber reinforced composite material with a favorable 0° tensile strength, cured epoxy resin produced by curing at 180° C. for 2 hours preferably has a rubber-state elastic modulus of 23 MPa or less, more preferably 20 MPa or less, still more preferably 15 MPa or less, and particularly preferably 12 MPa or less.

For the present invention, other components such as an epoxy resin other than [A] and [B] and a copolymer of an epoxy resin and a thermosetting resin may be contained. Examples of the aforementioned thermosetting resin to be copolymerized with an epoxy resin include, for instance, unsaturated polyester resin, vinyl ester resin, epoxy resin, benzoxazine resin, phenol resin, urea resin, melamine resin, and polyimide resin. These resin compositions and compounds may be used singly or in combination as appropriate.

Examples of the epoxy resin other than [A] and [B] include bisphenol A type epoxy resins that are solid at room temperature, bisphenol F type epoxy resins that are solid at room temperature, bisphenol S type epoxy resins, naphthalene type epoxy resins, biphenyl type epoxy resins, urethane-modified epoxy resins, phenol novolac type ones, orthocresol novolac type ones, tris-hydroxyphenyl methane type ones, tetraphenylol ethane type ones, isocyanurate type ones, and hydantoin type ones.

Compared to liquid bisphenol A type epoxy resins, bisphenol A type epoxy resins that are solid at room temperature can serve to form a tougher structure although lower in crosslink density and accordingly lower in heat resistance. An epoxy resin with a naphthalene backbone will give cured resin having both a low water absorption percentage and a high heat resistance. In addition, biphenyl type epoxy resins, dicyclopentadiene type epoxy resins, phenol aralkyl type epoxy resins, and diphenyl fluorene type epoxy resins are also preferred because they give cured resin with a low water absorption percentage. Urethane modified epoxy resins and isocyanate modified epoxy resins give cured resin with a high fracture toughness and a high elongation percentage.

Commercially available products of bisphenol A type epoxy resin that is solid at room temperature include jER (registered trademark) 1001, jER (registered trademark) 1004, and jER (registered trademark) 1007 (all manufactured by Mitsubishi Chemical Corporation). Commercially available products of bisphenol F type epoxy resin include jER (registered trademark) 4005P and jER (registered trademark) 4007P (both manufactured by Mitsubishi Chemical Corporation) and Epotohto (registered trademark) YDF-2001 (manufactured by Nippon Steel & Sumikin Chemical Co., Ltd.). Commercial products of isocyanurate type epoxy resin include Tepic-P (manufactured by Nissan Chemical Industries, Ltd.). Commercial products of tris-hydroxyphenyl methane type epoxy resin include Tactix742 (manufactured by Huntsman Advanced Materials Gmbh). Commercial products of tetraphenylol ethane type epoxy resin include jER (registered trademark) 1031S (manufactured by Mitsubishi Chemical Corporation). Commercial products of biphenyl type epoxy resin include NC-3000 (manufactured by Nippon Kayaku Co., Ltd.). Commercial products of dicyclopentadiene type epoxy resin include Epiclon (registered trademark) HP7200 (manufactured by DIC). Commercial products of urethane modified epoxy resin include AER4152 (manufactured by Asahi Kasei Epoxy Co., Ltd.). Commercial products of phenol novolac type epoxy resin include DEN431 and DEN438 (both manufactured by The Dow Chemical Company) and jER (registered trademark) 152 (manufactured by Mitsubishi Chemical Corporation). Commercial products of orthocresol novolac type epoxy resin include EOCN-1020 (manufactured by Nippon Kayaku Co., Ltd.) and Epiclon (registered trademark) N-660 (manufactured by DIC). Commercial products of hydantoin type epoxy resin include AY238 (manufactured by Huntsman Advanced Materials Gmbh).

As another preferred embodiment of the present invention, thermoplastic resin [D] which is soluble in epoxy resin may be contained. The expression of "being soluble in epoxy resin" used in the above description means that there exists a temperature region where thermoplastic resin [D] can form a uniform-phase mixture when heated, or heated while stirring, with an epoxy resin composition containing [A] and [B]. Here, the expression of "forming a uniform phase" means that a state free of separated components is realized at least in visual observation. As long as a uniform phase is formed in a particular temperature region, separation may occur in other temperature regions such as room temperature. The solubility of thermoplastic resin [D] in an epoxy resin composition containing [A] and [B] can also be evaluated by the following method. Specifically, powder of thermoplastic resin [D] is mixed with an epoxy resin composition containing [A] and [B] and maintained at a constant temperature lower than the melting point of thermoplastic resin [D] for several hours, 2 hours for instance, while observing the changes in viscosity. Thermoplastic resin [D] can be assumed to be soluble in the epoxy resin composition containing [A] and [B] if substantial changes in viscosity are seen. Thermoplastic resin [D] may undergo phase separation during the process of curing the resin if thermoplastic resin [D] has solubility in the epoxy resin composition containing [A] and [B]. However, it is preferably free of phase separation during the curing process in order to obtain cured epoxy resin and carbon fiber reinforced composite material that have high solvent resistance. In order to provide carbon fiber reinforced composite material with improved mechanical characteristics, solvent resistance, etc., it is more preferable that thermoplastic resin [D] be first dissolved in the epoxy resin composition containing [A] and [B], followed by mixing. Dissolution and subsequent mixing allows uniform dispersion in the epoxy resin composition to occur easily.

In general, this thermoplastic resin is preferably one in which the backbone chain contains a bond selected from the group consisting of carbon-carbon bond, amide bond, imide bond, ester bond, ether bond, carbonate bond, urethane bond, thioether bond, sulfone bond, and carbonyl bond. This thermoplastic resin, furthermore, may partially contain crosslinked structures and may be either crystalline or amorphous. It is particularly preferable that at least one resin selected from the group consisting of polyamide, polycarbonate, polyacetal, polyphenylene oxide, polyphenylene sulfide, polyallylate, polyester, polyamide-imide, polyimide, polyetherimide, polyimide having a phenyl trimethyl indane structure, polysulfone, polyethersulfone, polyether ketone, polyether ether ketone, polyaramid, polyether nitrile, and polybenz imidazole, is mixed or dissolved in any epoxy resin component contained in the above epoxy resin composition.

To ensure a high heat resistance, in particular, the thermoplastic resin preferably has a glass transition temperature (Tg) of at least 150° C. or more, more preferably 170° C. or more. If the glass transition temperature of the thermoplastic resin contained is less than 150° C., moldings produced therefrom may liable to thermal deformation. Furthermore, the terminal functional group in the thermoplastic resin is preferably the hydroxyl group, carboxyl group, thiol group, or an anhydride because they are reactive with a cationic-polymerizing compound. Specifically, examples include commercial products of polyethersulfone such as Sumikaexcel (registered trademark) PES3600P, Sumikaexcel (registered trademark) PES5003P, Sumikaexcel (registered trademark) PES5200P, Sumikaexcel (registered trademark) PES7600P (all manufactured by Sumitomo Chemical Co., Ltd.), and Virantage (registered trademark) VW-10700RFP (manufactured by Solvay Advanced Polymers, L.L.C.); copolymeric oligomers of polyethersulfone and polyether ether sulfone as described in Published Japanese Translation of PCT International Publication JP 2004-506789; and commercial products of polyetherimide such as Ultem (registered trademark) 1000, Ultem (registered trademark) 1010, and Ultem (registered trademark) 1040 (all manufactured by Solvay Advanced Polymers, L.L.C.). An oligomer is a relatively low molecular weight polymer composed of a finite number, commonly 10 to 100, of monomers bonded to each other.

Epoxy resin and thermoplastic resin tend to give better results when used as a mixture than when used separately. The brittleness of the epoxy resin is compensated by the toughness of the thermoplastic resin while the low moldability of the thermoplastic resin is compensated by the epoxy resin, allowing the mixture to work as base resin in a good balance. In regard to the ratio (in parts by mass) between the epoxy resin and thermoplastic resin that ensures a good balance, the blending quantity of the thermoplastic resin is preferably 1 to 40 parts by mass, more preferably 3 to 30 parts by mass, relative to the total quantity, or 100 parts by mass, of the epoxy resin.

For the present invention, it is also preferable to add thermoplastic resin particles [E] to the epoxy resin composition according to the present invention. The addition of thermoplastic resin particles [E] serves to produce a carbon fiber reinforced composite material with an improved matrix resin toughness and improved impact resistance.

Useful materials for thermoplastic resin particles [E] include those which are included in the list of various thermoplastic resins given above and able to work effectively as a mixture with an epoxy resin composition. In particular, polyamides are highly preferable and among other polyamides, nylon 12, nylon 6, nylon 11, nylon 66, nylon 6/12 copolymers, and a nylon partially modified with an epoxy compound into an IPN (interpenetrating polymer network) structure (semi-IPN nylon) as described in Example 1 of Japanese Unexamined Patent Publication (Kokai) No. HEI 01-104624 can realize a particularly high-strength adhesion with epoxy resin. In regard to the shape of the thermoplastic resin particles [E], they may be spherical particles, non-spherical particles, or porous particles, of which spherical particles are preferable because they ensure high viscoelasticity by preventing reduction in the flow characteristics of the resin and also ensure high impact resistance by eliminating potential starting points of stress concentrations. Useful commercial products of polyamide particles include SP-500, SP-10, TR-1, TR-2, 842P-48, and 842P-80 (all manufactured by Toray Industries, Inc.), Toraypearl (registered trademark) TN (manufactured by Toray Industries, Inc.), and Orgasol (registered trademark) 1002D, 2001UD, 2001EXD, 2002D, 3202D, 3501D, and 3502D (all manufactured by Arkema K.K.).

The epoxy resin composition according to the present invention may contain a coupling agent, thermosetting resin particles, or inorganic fillers such as silica gel, carbon black, clay, carbon nanotube, carbon particles, and metal powder, unless they impair the advantageous effect of the invention.

As the carbon fiber to be used for the present invention, a wide variety of carbon fibers are available to meet particular requirements, but the carbon fiber preferably has a tensile modulus of at least 200 GPa, more preferably in the range of 200 to 600 GPa, and still more preferably in the range of 250 to 450 GPa in order to maintain a high impact resistance, a high tensile strength, and a high compression strength simultaneously. From the viewpoint of strength of carbon fiber, it is preferable to use carbon fiber having a tensile strength of 4.0 GPa or more, more preferably in the range of 4.0 to 7.5 GPa, and still more preferably in the range of 5.0 to 7.0 GPa, because such carbon fiber can provide composite material having good mechanical characteristics including high rigidity, high tensile strength, and high compression strength. Tensile elongation is also an important factor, and it is preferable to use high-elongation carbon fiber having a tensile elongation percentage of 1.5% or more. The most suitable carbon fiber will simultaneously exhibit various characteristics including a tensile modulus of at least 200 GPa or more, a tensile strength of at least 4.0 GPa or more, and a tensile elongation of at least 1.5% or more.

Commercial products of carbon fibers include Torayca (registered trademark) T800G-24K, Torayca (registered trademark) T800S-24K, Torayca (registered trademark) T810G-24K, Torayca (registered trademark) T700G-24K, Torayca (registered trademark) T300-3K, and Torayca (registered trademark) T700S-12K (all manufactured by Toray Industries, Inc.).

In regard to the form and way of alignment of carbon fibers, long fibers paralleled in one direction, woven fabric, or others may be selected appropriately, but if a carbon fiber reinforced composite material that is lightweight and relatively highly durable is to be obtained, it is preferable to use carbon fibers in the form of long fibers (fiber bundles) paralleled in one direction, woven fabric, or other continuous fibers.

The carbon fiber bundles to be used for the present invention preferably contain 2,500 to 50,000 filaments per fiber bundle. If the number of filaments is less than 2,500, the fibers may be easily caused to meander, leading to a decrease in strength. If the number of filaments is more than 50,000, resin impregnation may be difficult to perform during prepreg preparation or during molding. The number of filaments is more preferably in the range of 2,800 to 36,000.

The prepreg according to the present invention is produced by impregnating carbon fiber with the epoxy resin composition according to the present invention. In the prepreg, the content of carbon fiber is preferably 40 to 90 mass %, more preferably 50 to 80 mass %. If the mass fraction of the carbon fiber is too small, the resulting composite material will be too heavy and the advantage of the carbon fiber reinforced composite material having a high specific strength and specific modulus will be impaired in some cases, while if the mass fraction of the carbon fiber is too large, impregnation with the resin composition will not be achieved sufficiently and the resulting carbon fiber reinforced composite material will suffer from many voids, possibly leading to large deterioration in mechanical characteristics such as tensile strength and compression strength.

The prepreg according to the present invention preferably has a structure in which a layer rich in thermoplastic resin particles [E], that is, a layer in which localized existence of thermoplastic resin particles [E] is clearly seen in observed cross sections (hereinafter occasionally referred to as particle layer), is formed near a surface of the prepreg.

If a carbon fiber reinforced composite material is produced by stacking prepreg layers and curing the epoxy resin, this structure allows a resin layer to be formed easily between prepreg layers, i.e., composite material layers.

Accordingly, strong adhesion and contact will be achieved between the composite material layers and the resulting carbon fiber reinforced composite material will have high impact resistance.

From this point of view, particle layer as described above preferably exists in a depth range accounting for 20%, more preferably 10%, of the total (100%) thickness of the prepreg, as measured from a surface of the prepreg in the thickness direction. Furthermore, the particle layer may exist only at one side, but cautions are necessary because the resulting prepreg will have two surfaces with different features. If interlaminar regions containing particles and those free of particles coexist as a result of stacking prepreg layers in an inappropriate way by mistake, the resulting composite material will be low in impact resistance. It is preferable that a particle layer exists at each side of the prepreg to allow the prepreg to have two identical surfaces and make the stacking operation easy.

Furthermore, the proportion of thermoplastic resin particles [E] existing in the particle layers is preferably 90 to 100 mass %, more preferably 95 to 100 mass %, of the total quantity, or 100 mass %, of thermoplastic resin particles [E] existing in the prepreg.

This proportion of thermoplastic resin particles [E] can be evaluated by, for example, the undermentioned method. Specifically, a prepreg layer is interposed between two polytetrafluoroethylene resin plates having smooth surfaces and brought into strong contact with them, and then the temperature is increased gradually so as to reach a curing temperature in 7 days to ensure gelation and curing, thus producing a cured prepreg plate. In each surface of the cured prepreg plate, a line parallel to the surface of the cured prepreg plate is drawn at a depth, measured from the surface of the prepreg, equal to 20% of its thickness. Then, the total area of thermoplastic resin particles [E] existing between each surface of the prepreg and each of the lines drawn above and the total area of thermoplastic resin particles [E] existing across the entire thickness of the prepreg are determined, followed by calculating the proportion of the area of thermoplastic resin particles [E] existing in the regions of 20% depth from the prepreg surfaces to their total area across the entire, or 100%, thickness of the prepreg. Here, the total area of thermoplastic resin particles [E] is determined by cutting the portions occupied by thermoplastic resin particles [E] out of a cross-sectional photograph and converting their mass. When it is found difficult to distinguish each of thermoplastic resin particles [E] dispersed in the resin in the photograph, thermoplastic resin particles [E] may be dyed.

The prepreg according to the present invention can be produced favorably by some different methods including a wet method in which the epoxy resin composition according to the present invention is dissolved in a solvent such as methyl ethyl ketone and methanol to produce a solution with a decreased viscosity and then used to impregnate carbon fiber, and a hot melt method in which the epoxy resin composition is heated to decrease its viscosity and then used to impregnate carbon fiber.

In the wet method, the carbon fiber is immersed in a solution of the epoxy resin composition and then pulled out, and the solvent is evaporated using a tool such as oven to provide prepreg.

In the hot melt method, an epoxy resin composition, with its viscosity decreased by heating, is used directly to impregnate carbon fiber. Alternatively, resin films are prepared by coating release paper or the like with an epoxy resin composition and the resin films are used to cover either or both sides of carbon fiber sheets and pressed under heat so that the epoxy resin composition is transferred into them for impregnation, thereby providing prepreg. This hot melt method is preferred because substantially no solvent will remain in the prepreg.

The carbon fiber reinforced composite material according to the present invention can be produced by, for example, stacking a plurality of prepreg sheets prepared by a method as described above and heat and pressure are applied to the resulting layered body to heat-cure the epoxy resin composition.

The application of heat and pressure is carried out by using an appropriate method such as press molding, autoclave molding, bagging molding, wrapping tape molding, and internal pressure molding. In particular, wrapping tape molding and internal pressure molding have been preferred for production of molded sports goods.

In the wrapping tape molding method, a core bar such as mandrel is wound with a prepreg sheet to produce a tube of carbon fiber reinforced composite material, and this method is suitable for manufacturing rod-like products including golf club shaft and fishing rod. More specifically, a mandrel is wound with a prepreg sheet and further wound with a wrapping tape of thermoplastic resin film to cover the prepreg so that the prepreg is secured and pressed, followed by heating and curing the epoxy resin composition in an oven and removing the core bar to provide a tubular material.

In the internal pressure molding method, a preform formed of an internal pressure-applying body such as a tube of thermoplastic resin wound with a prepreg sheet is fixed in a mold, and high pressure gas is introduced into the internal pressure-applying body to apply pressure and heat the mold simultaneously to produce a tube-like body. The internal pressure molding method has been preferred particularly for the molding of articles of a complicated shape such as golf club shaft, bat, and racket for tennis or badminton.

As an example, the carbon fiber reinforced composite material according to the present invention can be produced by stacking sheets of the aforementioned prepreg according to the present invention into a required shape and subsequently pressing under heat to cure the epoxy resin.

In another process, the carbon fiber reinforced composite material according to the present invention can also be produced from the aforementioned epoxy resin composition through a prepreg-free process.

This can be effected by, for example, impregnating carbon fiber directly with the epoxy resin composition according to the present invention, and subsequently heat-curing it, and available techniques include hand lay-up, filament winding, pultrusion, resin injection molding, and resin transfer molding. These methods are carried out preferably by mixing one or more base resins formed of epoxy resin and one or more curing agents immediately before use to prepare an epoxy resin composition.

The carbon fiber reinforced composite material according to the present invention can be used favorably in a wide variety of applications including aircraft structure members, windmill blades, automobiles' exterior plates, computer parts such as IC trays and notebook computer housing, and sporting goods such as golf club shaft and tennis racket.

EXAMPLES

The epoxy resin composition according to the invention as well as prepreg and carbon fiber reinforced composite material produced therefrom are described in detail below with reference to Examples. Described below are carbon fiber and resin materials used in Examples, and production methods for cured epoxy resin, prepreg, and carbon fiber reinforced composite material, as well as evaluation methods for the flexural modulus and rubber-state elastic modulus of cured epoxy resin and evaluation methods for the 0° tensile strength and the 0° compression strength of carbon fiber reinforced composite material. Preparation and evaluation of prepreg samples in Examples were performed in an atmosphere with a temperature of 25° C.±2° C. and relative humidity of 50% unless otherwise specified.

<Carbon Fiber>

Torayca (registered trademark) T800G-24K-31E (carbon fiber with 24,000 filaments/bundle, tensile strength of 5.9 GPa, tensile modulus of 294 GPa, tensile elongation of 2.0%, manufactured by Toray Industries, Inc.).

<Epoxy Resin [A]>

Tetraglycidyl-4,4'-diaminobenzanilide synthesized by the following method

In a four-necked 2-liter flask equipped with a stirring device, cooling device, and thermometer, 136.4 g (0.60 mol) of 4,4'-diaminobenzanilide, 666.1 g (7.20 mol) of epichlorohydrin, and 27.2 g (1.5 mol) of water were fed at room temperature and allowed to react at 70° C. for 2 hours while performing nitrogen purge. Subsequently, the mixture was heated to 80° C. and reacted for additional 24 hours. After the end of the reaction, the mixture was cooled to 30° C. and 6.1 g (0.02 mol) of tetrabutylammonium hydrogensulfate was added and then 300.0 g (3.60 mol) of 48% aqueous solution of sodium hydroxide was dropped in such a way that the dropping would end in 30 minutes while controlling the temperature at 30±5° C., followed by additional reaction for 2 hours at the temperature. Then 341 g (18.9 mol) of water and 341 g (4.73 mol) of tetrahydrofuran were added to the reaction liquid and stirred for 5 minutes, followed by separating the liquid layers (upper layer is the oil layer). To the resulting oil layer, 341 g (18.9 mol) of water was added, and washing and liquid layer separation were performed again (lower layer is the oil layer). The oil layer was filtrated and condensed under reduced pressure conditions to remove tetrahydrofuran and epichlorohydrin. Then 150 g (1.63 mol) of toluene was added to the resulting organic substance and condensed again under reduced pressure conditions to remove toluene, thereby providing 290 g of brown viscous solid containing tetraglycidyl-4,4'-diaminobenzanilide as intended.

Tetraglycidyl-3,4'-diaminobenzanilide synthesized by the following method

Except for using 3,4'-diaminobenzanilide as precursor compound for the epoxy resin to be synthesized, glycidyl formation reaction was carried out by the same procedure under the same reaction conditions as in the above case of tetraglycidyl-4,4'-diaminobenzanilide to produce tetraglycidyl-3,4'-diaminobenzanilide as intended.

<Epoxy Resin [B]> jER (registered trademark) 825 (manufactured by Mitsubishi Chemical Corporation)

Epiclon (registered trademark) 830 (bisphenol F type epoxy resin, manufactured by DIC)

Araldite (registered trademark) MY721 (tetraglycidyl diaminodiphenyl methane, manufactured by Huntsman Advanced Materials Gmbh)

Araldite (registered trademark) MY0600 (triglycidyl-m-aminophenol, manufactured by Huntsman Advanced Materials Gmbh)

Araldite (registered trademark) MY0510 (triglycidyl-p-aminophenol, manufactured by Huntsman Advanced Materials Gmbh)

Toray Epoxy PG-01 (diglycidyl-p-phenoxy aniline, manufactured by Toray Fine Chemicals Co., Ltd.)

<Curing Agent [C]>

4,4'-DABAN (4,4'-diaminobenzanilide, manufactured by Nipponjunryo Chemicals)

3,4'-DABAN (3,4'-diaminobenzanilide, manufactured by Nipponjunryo Chemicals)

Seikacure S (4,4'-diaminodiphenyl sulfone, manufactured by Wakayama Seika Kogyo Co., Ltd.)

3,3'-DAS (3,3'-diaminodiphenyl sulfone, manufactured by Mitsui Fine Chemical, Inc.)

<Thermoplastic Resin [D]>

Virantage (registered trademark) VW-10700RFP (polyethersulfone, manufactured by Solvay Advanced Polymers, L.L.C.)

<Thermoplastic Resin Particles [E]>

Semi-IPN nylon particles A prepared by the following production method

First, 90 parts by mass of transparent polyamide (trade name Grilamide (registered trademark)-TR55, manufactured by EMS-Chemie (Japan) Ltd.), 7.5 parts by mass of epoxy resin (trade name jER (registered trademark) 828 (manufactured by Mitsubishi Chemical Corporation)), and 2.5 parts by mass of a curing agent (trade name Tormide (registered trademark) #296, manufactured by Fuji Kasei Kogyo Co., Ltd.) were added to a mixed solvent of 300 parts by mass of chloroform and 100 parts by mass of methanol to prepare a uniform solution. Then, using a spray gun designed for painting, the resulting solution was sprayed strongly against the liquid surface of 3,000 parts by mass of well-stirred n-hexane so as to separate out the solute. The precipitated solid was separated by filtration, washed well with n-hexane, and vacuum-dried at a temperature of 100° C. for 24 hours to provide perfect spherical semi-IPN nylon particles A with an average particle diameter of 13.0 μm.

(1) Preparation Method for Epoxy Resin Composition

Using a kneading apparatus, a mixture of epoxy resin and thermoplastic resin of different types and proportions as specified in Tables 1 to 5 was kneaded at 160° C. for 2 hours. After confirming complete dissolution of the thermoplastic resin by visual observation, the mixture was cooled to 70° C. and a curing agent was added, followed by further kneading to prepare an epoxy resin composition.

(2) Production of a Cured Epoxy Resin Composition (Cured Epoxy Resin)

The epoxy resin composition prepared in (1) above was injected into a mold having a plate-like cavity with a thickness of 2 mm and heat-cured in an oven under the following conditions to provide a cured resin plate.

(1) Heating from 30° C. to 180° C. at a rate of 1.5° C./min
(2) Maintaining a temperature of 180° C. for 2 hours
(3) Cooling from 180° C. to 30° C. at a rate of 2.5° C./min (3) Measurement of Flexural Modulus of Cured Epoxy Resin A test piece with a length of 60 mm and a width of 10 mm was cut out of the cured resin plate with a thickness of 2 mm prepared by the method described in (2) above and subjected to three-point bending test using a universal testing machine (Instron (registered trademark) 5565 P8564, manufactured by Instron Japan Co., Ltd.) under the conditions of a testing rate of 2.5 mm/min and support interval of 32 mm to determine the flexural modulus according to JIS K7171-1994. Measurements were taken at a temperature of 25° C.

(4) Measurement of Rubber-State Elastic Modulus of Cured Epoxy Resin

A test piece with a length of 55 mm and a width of 12.7 mm is cut out of the cured resin plate with a thickness of 2 mm prepared by the method described in (2) above and subjected to dynamic torsion measurement (DMA measurement) in the temperature range of −40° C. to 300° C. using a dynamic viscoelasticity measuring apparatus (ARES-2KFRTN1-FCO-STD, manufactured by TA Instruments) according to JIS K7244-7 (2007) under the conditions of a torsion vibration frequency of 1.0 Hz, generated torque of $3.0 \times 10^{-4}$ to $2.0 \times 10^{-2}$ N·m, and heating rate of 5.0° C./min, thereby determining the storage elastic modulus in the temperature range of −30° C. to 290° C. In the resulting temperature-storage elastic modulus curve, the glass transition temperature is defined as the temperature represented by the intersection between the baseline in the lower temperature part of the curve and the largest-gradient tangent to that part of the curve where the storage elastic modulus sharply changes, and the rubber-state elastic modulus is defined as the storage elastic modulus at the temperature higher by 50° C. than the glass transition temperature.

(5) Preparation of Prepreg

An epoxy resin composition prepared by the method described in (1) above was spread on release paper using a knife coater in such a manner that the resin areal weight would be 50 g/m² to provide resin film. Sheets of this resin film were attached to both sides of a sheet of carbon fiber with fibers paralleled in one direction (areal weight 200 g/m²) and then using heating rollers, the carbon fiber was impregnated with an epoxy resin composition by heating at a temperature of 100° C. and pressing at a pressure of 1 atm, thereby providing prepreg.

(6) Definition of 0° Direction of Carbon Fiber Reinforced Composite Material

As specified in JIS K7017 (1999), the axis direction of unidirectional carbon fiber reinforced composite material is defined as its fiber direction and the 0° axis is assumed to be in the axis direction. A direction perpendicular to the axis is at 90° from the axis.

(7) Measurement of 0° Tensile Strength of Carbon Fiber Reinforced Composite Material Sheets of a specified size were cut out of unidirectional prepreg and six of them were stacked with their axes aligned in one direction, subjected to vacuum bag molding, and cured in an autoclave for 2 hours at a temperature of 180° C. and a pressure of 6 kg/cm², thereby providing unidirectional reinforced material (carbon fiber reinforced composite material). A tab was bonded to this unidirectional reinforced material as specified in ASTM D3039-00 and a rectangular part with a length of 254 mm and a width of 12.7 mm was cut out to provide a test piece with its 0° direction aligned in the length direction. The resulting 0° directional tensile test piece was subjected to tensile test in a 23° C. environment according to ASTM D3039-00 using a universal testing machine (Instron (registered trademark) 5565 P8564, manufactured by Instron Japan Co., Ltd.) at a testing rate of 1.27 mm/min.

(8) Measurement of 0° Compression Strength of Carbon Fiber Reinforced Composite Material Sheets of a specified size were cut out of unidirectional prepreg and six of them were stacked with their axes aligned in one direction, subjected to vacuum bag molding, and cured in an autoclave for 2 hours at a temperature of 180° C. and a pressure of 6 kg/cm², thereby providing unidirectional reinforced material (carbon fiber reinforced composite material). A tab was bonded to this unidirectional reinforced material as specified in SACMA-SRM 1R-94 and a rectangular part with a length of 80.0 mm and a width of 15.0 mm was cut out to provide a test piece with its 0° direction aligned in the length direction. The resulting 0° directional compression test piece was subjected to compression test in a 23° C. environment according to SACMA-SRM 1R-94 using a universal testing machine (Instron (registered trademark) 5565 P8564, manufactured by Instron Japan Co., Ltd.) at a testing rate of 1.0 mm/min.

Example 1

Using a kneading apparatus, 70 parts by mass of tetraglycidyl-4,4'-diaminobenzanilide, 30 parts by mass of jER825, and 3 parts by mass Virantage (registered trademark) VW-10700RFP were kneaded at 160° C. for 2 hours and cooled to 70° C. after confirming complete dissolution of Virantage (registered trademark) VW-10700RFP by visual observation. Then, 34 parts by mass of 4,4'-DABAN was added, followed by kneading to provide an epoxy resin composition. Table 1 lists the components and proportions (figures in Table 1 are in parts by mass).

From the resulting epoxy resin composition, a cured epoxy resin was produced by the preparation method for a cured product of an epoxy resin composition described in (2) above. The flexural modulus and rubber-state elastic modulus of the resulting cured epoxy resin were measured by the measuring method for flexural modulus of cured epoxy resin described in (3) above and the measuring method for rubber-state elastic modulus of cured epoxy resin described in (4) above.

From the resulting epoxy resin composition, prepreg was produced by the preparation method for prepreg described in (5) above. The 0° tensile strength and 0° compression strength of the resulting prepreg were measured by the measuring method for 0° tensile strength of carbon fiber reinforced composite material described in (7) above and the measuring method for 0° compression strength of carbon fiber reinforced composite material described in (8) above. Results are given in Table 1.

Examples 2 to 6 and Comparative Examples 1 to 8

Except that the types and proportions of the epoxy resin and curing agent used were as shown in Tables 1 and 4, the same procedure as in Example 1 was carried out to produce cured epoxy resin and prepreg and their flexural modulus, rubber-state elastic modulus, 0° tensile strength, and 0° compression strength were measured. Results are shown in Tables 1 and 4. In Examples 1 to 6, the use of tetraglycidyl-4,4'-diaminobenzanilide as component [A] resulted in a low rubber-state elastic modulus and a high flexural modulus. It also led to a high 0° tensile strength and a high 0° compression strength. In Comparative examples 1 to 8, MY721, MY0600, or MY0510 were used instead of tetraglycidyl-4,4'-diaminobenzanilide, resulting in a lower flexural modulus than in Examples 1 to 6 as well as a low 0° tensile strength and a low 0° compression strength.

Comparative Example 9

Except that the types and proportions of the epoxy resin and curing agent used were as shown in Table 4, the same procedure as in Example 1 was carried out to produce cured epoxy resin and its flexural modulus and rubber-state elastic modulus were measured. When prepreg was prepared by the method described in (4) above, the epoxy resin composition was too high in viscosity and accordingly, the carbon fiber was not impregnated sufficiently with the epoxy resin composition. When carbon fiber reinforced composite material was prepared by the methods described in (7) and (8) above, it was impossible to cut the prepreg, failing to provide carbon fiber reinforced composite material.

Examples 7-10

Except that the types and proportions of the epoxy resin and curing agent used were as shown in Table 1, the same procedure as in Example 1 was carried out to produce cured epoxy resin and prepreg and their flexural modulus, rubber-state elastic modulus, 0° tensile strength, and 0° compression strength were measured. Results are given in Table 1. In Examples 7 to 10, the rubber-state elastic modulus was low and the flexural modulus was high. As the blending quantity of tetraglycidyl-4,4'-diaminobenzanilide was decreased from 70 parts by mass to 40 parts by mass, the flexural modulus slightly decreased as compared to Examples 1 to 6, despite a high 0° tensile strength and a high 0° compression strength.

Examples 11 to 15 and Comparative examples 10 to 14

Except that the types and proportions of the epoxy resin and curing agent used were as shown in Tables 2 and 5, the same procedure as in Example 1 was carried out to produce cured epoxy resin and prepreg and their flexural modulus, rubber-state elastic modulus, 0° tensile strength, and 0° compression strength were measured. Results are given in Tables 2 and 5. In Examples 11 to 15, the rubber-state elastic modulus was low and the flexural modulus was high. The 0° tensile strength and the 0° compression strength were both high. As the proportion of tetraglycidyl-4,4'-diaminobenzanilide was increased, it was seen that the flexural modulus and rubber-state elastic modulus both tend to increase and the 0° compression strength also tend to improve. In Comparative examples 10 to 14, MY721 was used instead of tetraglycidyl-4,4'-diaminobenzanilide, resulting in a lower flexural modulus than in Examples 11 to 15 as well as a low 0° tensile strength and a low 0° compression strength.

Examples 16 and 17

Except that the types and proportions of the epoxy resin and curing agent used were as shown in Table 2, the same procedure as in Example 1 was carried out to produce cured epoxy resin and prepreg and their flexural modulus, rubber-state elastic modulus, 0° tensile strength, and 0° compression strength were measured. Results are given in Table 2. In Examples 16 and 17, the rubber-state elastic modulus was low and the flexural modulus was high. The 0° tensile strength and the 0° compression strength were both high. As tetraglycidyl-4,4'-diaminobenzanilide was replaced with tetraglycidyl-3,4'-diaminobenzanilide, the flexural modulus improved without suffering a significant change in rubber-state elastic modulus as compared to Examples 1 and 6. The 0° tensile strength and 0° compression strength both improved.

Examples 18 to 24 and Comparative Examples 15 to 17

Except that the types and proportions of the epoxy resin and curing agent used were as shown in Tables 3 and 5, the same procedure as in Example 1 was carried out to produce cured epoxy resin and prepreg and their flexural modulus, rubber-state elastic modulus, 0° tensile strength, and 0° compression strength were measured. Results are given in Tables 3 and 5. In Examples 18 to 24, the rubber-state elastic modulus was low and the flexural modulus was high. The 0° tensile strength and the 0° compression strength were both high. In Examples 18, 19, and 22, in which 3,4'-DABAN, instead of 4,4'-DABAN, was used as curing agent, the changes in rubber-state elastic modulus were not significant compared to Examples 1, 16, and 6, leading to an improved flexural modulus and improved 0° compression strength. In Examples 20 and 23, in which Seikacure S, instead of 4,4'-DABAN, was used as curing agent, the flexural modulus decreased compared to Examples 1 and 6, and the 0° compression strength decreased. In Comparative examples 15 to 17, MY721 was used instead of tetraglycidyl-4,4'-diaminobenzanilide, resulting in a lower flexural modulus than in Examples 18 to 20 as well as a low 0° tensile strength and a low 0° compression strength.

Examples 25 and 26

Except that the types and proportions of the epoxy resin and curing agent used were as shown in Table 3, the same procedure as in Example 1 was carried out to produce cured epoxy resin and prepreg and their flexural modulus, rubber-state elastic modulus, 0° tensile strength, and 0° compression strength were measured. Results are given in Table 3. In Examples 25 and 26, the rubber-state elastic modulus was low and the flexural modulus was high. The 0° tensile strength and the 0° compression strength were both high. Comparing Example 25 and Example 26, an increase in the blending quantity of Virantage (registered trademark) VW-10700RFP led to an increase in 0° tensile strength.

Example 27

Except that thermoplastic resin particles were added as shown in Table 3 with the aim of providing carbon fiber reinforced composite material with improved impact resistance, the same procedure as in Example 1 was carried out to produce cured epoxy resin and prepreg and their flexural modulus, rubber-state elastic modulus, 0° tensile strength, and 0° compression strength were measured. Results are given in Table 3. The values of flexural modulus, 0° tensile strength, and 0° compression strength obtained in Example 27 were similar to those in Example 1.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Epoxy resin composition | component [A] tetraglycidyl-4,4'-diaminobenzanilide tetraglycidyl-3,4'-diaminobenzanilide component [B] | 70 | 70 | 70 | 70 | 70 | 70 | 40 | 40 | 40 | 40 |

TABLE 1-continued

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
|  | bisphenol A type epoxy (jER825) | 30 |  |  |  |  |  |  | 30 |  |  |
|  | bisphenol F type epoxy (Epiclon830) |  | 30 |  |  |  |  |  |  |  |  |
|  | tetraglycidyl diaminodiphenyl methane (MY721) |  |  | 30 |  |  |  | 30 | 30 | 30 |  |
|  | triglycidyl-m-aminophenol (MY0600) |  |  |  | 30 |  |  | 30 |  |  | 30 |
|  | triglycidyl-p-aminophenol (MY0510) |  |  |  |  | 30 |  |  |  |  |  |
|  | diglycidyl-p-phenoxy aniline (Toray Epoxy PG-01) |  |  |  |  |  | 30 |  |  | 30 | 30 |
|  | component [C] |  |  |  |  |  |  |  |  |  |  |
|  | 4,4'-diaminobenzanilide (4,4'-DABAN) | 34 | 34 | 39 | 38 | 40 | 34 | 41 | 37 | 37 | 37 |
|  | 3,4'-diaminobenzanilide (3,4'-DABAN) |  |  |  |  |  |  |  |  |  |  |
|  | 4,4'-diaminodiphenyl sulfone (Seikacure S) |  |  |  |  |  |  |  |  |  |  |
|  | 3,3'-diaminodiphenyl sulfone (3,3'-DAS) |  |  |  |  |  |  |  |  |  |  |
|  | component [D] |  |  |  |  |  |  |  |  |  |  |
|  | polyethersulfone (Virantage VW-10700RFP) | 3 | 3 | 3 | 3 | 3 | 3 | 3 | 3 | 3 | 3 |
| Properties of cured resin | bending elastic modulus (GPa) | 4.9 | 5.0 | 5.2 | 5.5 | 5.4 | 5.4 | 4.9 | 4.5 | 4.9 | 5.0 |
|  | rubber-state elastic modulus (MPa) | 15.5 | 15.3 | 22.8 | 21.8 | 22.5 | 10.3 | 22.0 | 15.8 | 9.8 | 9.5 |
| Properties of composite material | 0° tensile strength (MPa) | 3095 | 3122 | 2971 | 3019 | 3005 | 3523 | 2948 | 3055 | 3433 | 3464 |
|  | 0° compression strength (MPa) | 1880 | 1911 | 1970 | 2049 | 2021 | 2011 | 1890 | 1810 | 1888 | 1910 |

TABLE 2

|  |  | Example 11 | Example 12 | Example 13 | Example 14 | Example 15 | Example 16 | Example 17 |
|---|---|---|---|---|---|---|---|---|
| Epoxy resin composition | component [A] |  |  |  |  |  |  |  |
|  | tetraglycidyl-4,4'-diaminobenzanilide | 30 | 40 | 50 | 60 | 90 |  |  |
|  | tetraglycidyl-3,4'-diaminobenzanilide |  |  |  |  |  | 70 | 70 |
|  | component [B] |  |  |  |  |  |  |  |
|  | bisphenol A type epoxy (jER825) | 35 | 30 | 25 | 20 | 5 | 30 |  |
|  | bisphenol F type epoxy (Epiclon830) |  |  |  |  |  |  |  |
|  | tetraglycidyl diaminodiphenyl methane (MY721) |  |  |  |  |  |  |  |
|  | triglycidyl-m-aminophenol (MY0600) | 35 | 30 | 25 | 20 | 5 |  |  |
|  | triglycidyl-p-aminophenol (MY0510) |  |  |  |  |  |  |  |
|  | diglycidyl-p-phenoxy aniline (Toray Epoxy PG-01) |  |  |  |  |  |  | 30 |
|  | component [C] |  |  |  |  |  |  |  |
|  | 4,4'-diaminobenzanilide (4,4'-DABAN) | 36 | 36 | 36 | 36 | 36 | 34 | 34 |
|  | 3,4'-diaminobenzanilide (3,4'-DABAN) |  |  |  |  |  |  |  |
|  | 4,4'-diaminodiphenyl sulfone (Seikacure S) |  |  |  |  |  |  |  |
|  | 3,3'-diaminodiphenyl sulfone (3,3'-DAS) |  |  |  |  |  |  |  |
|  | component [D] |  |  |  |  |  |  |  |
|  | polyethersulfone (Virantage VW-10700RFP) | 3 | 3 | 3 | 3 | 3 | 3 | 3 |
| Properties of cured resin | bending elastic modulus (GPa) | 4.4 | 4.6 | 4.8 | 5.0 | 5.7 | 5.1 | 5.7 |
|  | rubber-state elastic modulus (MPa) | 14.9 | 15.6 | 17.3 | 19.4 | 22.8 | 15.9 | 10.7 |
| Properties of composite material | 0° tensile strength (MPa) | 3090 | 3083 | 3078 | 3070 | 3054 | 3102 | 3541 |
|  | 0° compression strength (MPa) | 1770 | 1810 | 1870 | 1906 | 2112 | 1934 | 2108 |

TABLE 3

|  |  | Example 18 | Example 19 | Example 20 | Example 21 | Example 22 | Example 23 | Example 24 | Example 25 | Example 26 | Example 27 |
|---|---|---|---|---|---|---|---|---|---|---|---|
| Epoxy resin composition | component [A] |  |  |  |  |  |  |  |  |  |  |
|  | tetraglycidyl-4,4'-diaminobenzanilide | 70 |  | 70 | 70 | 70 | 70 | 70 | 70 | 70 | 70 |
|  | tetraglycidyl-3,4'-diaminobenzanilide |  | 70 |  |  |  |  |  |  |  |  |
|  | component [B] |  |  |  |  |  |  |  |  |  |  |
|  | bisphenol A type epoxy (jER825) | 30 | 30 | 30 | 30 |  |  |  | 30 | 30 | 30 |
|  | bisphenol F type epoxy (Epiclon830) |  |  |  |  |  |  |  |  |  |  |

TABLE 3-continued

|  |  | Example 18 | Example 19 | Example 20 | Example 21 | Example 22 | Example 23 | Example 24 | Example 25 | Example 26 | Example 27 |
|---|---|---|---|---|---|---|---|---|---|---|---|
|  | tetraglycidyl diaminodiphenyl methane (MY721) |  |  |  |  |  |  |  |  |  |  |
|  | triglycidyl-m-aminophenol (MY0600) |  |  |  |  |  |  |  |  |  |  |
|  | triglycidyl-p-aminophenol (MY0510) |  |  |  |  |  |  |  |  |  |  |
|  | diglycidyl-p-phenoxy aniline (Toray Epoxy PG-01) |  |  |  |  | 30 | 30 | 30 |  |  |  |
|  | component [C] |  |  |  |  |  |  |  |  |  |  |
|  | 4,4'-diaminobenzanilide (4,4'-DABAN) |  |  |  |  |  |  |  | 34 | 34 | 34 |
|  | 3,4'-diaminobenzanilide (3,4'-DABAN) | 34 | 34 |  |  | 34 |  |  |  |  |  |
|  | 4,4'-diaminodiphenyl sulfone (Seikacure S) |  |  | 37 |  |  | 37 |  |  |  |  |
|  | 3,3'-diaminodiphenyl sulfone (3,3'-DAS) |  |  |  | 37 |  |  | 37 |  |  |  |
|  | component [D] |  |  |  |  |  |  |  |  |  |  |
|  | polyethersulfone (Virantage VW-10700RFP) | 3 | 3 | 3 | 3 | 3 | 3 | 3 | 3 | 6 | 3 |
|  | component [E] |  |  |  |  |  |  |  |  |  |  |
|  | semi-IPN nylon particles A |  |  |  |  |  |  |  |  |  | 20 |
| Properties of cured resin | bending elastic modulus (GPa) | 5.0 | 5.2 | 4.7 | 4.8 | 5.5 | 5.2 | 5.3 | 4.9 | 4.8 | 4.8 |
|  | rubber-state elastic modulus (MPa) | 15.6 | 16.2 | 15.7 | 16.0 | 10.8 | 10.1 | 10.7 | 15.7 | 15.3 | 15.4 |
| Properties of composite material | 0° tensile strength (MPa) | 3099 | 3110 | 3082 | 3089 | 3533 | 3475 | 3483 | 3075 | 3120 | 3097 |
|  | 0° compression strength (MPa) | 1918 | 1952 | 1840 | 1860 | 2052 | 1970 | 1995 | 1890 | 1855 | 1878 |

TABLE 4

|  |  | Comparative example 1 | Comparative example 2 | Comparative example 3 | Comparative example 4 | Comparative example 5 | Comparative example 6 | Comparative example 7 | Comparative example 8 | Comparative example 9 |
|---|---|---|---|---|---|---|---|---|---|---|
| Epoxy resin composition | component [A] |  |  |  |  |  |  |  |  |  |
|  | tetraglycidyl-4,4'-diaminobenzanilide |  |  |  |  |  |  |  |  | 100 |
|  | tetraglycidyl-3,4'-diaminobenzanilide |  |  |  |  |  |  |  |  |  |
|  | component [B] |  |  |  |  |  |  |  |  |  |
|  | bisphenol A type epoxy (jER825) | 30 |  |  |  |  | 30 | 30 |  |  |
|  | bisphenol F type epoxy (Epiclon830) |  | 30 |  |  |  |  |  |  |  |
|  | tetraglycidyl diaminodiphenyl methane (MY721) | 70 | 70 | 70 | 70 | 70 |  |  |  |  |
|  | triglycidyl-m-aminophenol (MY0600) |  |  | 30 |  |  | 70 |  | 100 |  |
|  | triglycidyl-p-aminophenol (MY0510) |  |  |  | 30 |  |  | 70 |  |  |
|  | diglycidyl-p-phenoxy aniline (Toray Epoxy PG-01) |  |  |  |  | 30 |  |  |  |  |
|  | component [C] |  |  |  |  |  |  |  |  |  |
|  | 4,4'-diaminobenzanilide (4,4'-DABAN) | 41 | 41 | 45 | 47 | 41 | 39 | 44 | 44 | 35 |
|  | 3,4'-diaminobenzanilide (3,4'-DABAN) |  |  |  |  |  |  |  |  |  |
|  | 4,4'-diaminodiphenyl sulfone (Seikacure S) |  |  |  |  |  |  |  |  |  |
|  | 3,3'-diaminodiphenyl sulfone (3,3'-DAS) |  |  |  |  |  |  |  |  |  |
|  | component [D] |  |  |  |  |  |  |  |  |  |
|  | polyethersulfone (Virantage VW-10700RFP) | 3 | 3 | 3 | 3 | 3 | 3 | 3 | 3 | 3 |
| Properties of cured resin | bending elastic modulus (GPa) | 3.6 | 3.7 | 4.3 | 4.2 | 4.2 | 4.2 | 4.0 | 4.7 | 5.8 |
|  | rubber-state elastic modulus (MPa) | 16.1 | 15.8 | 23.1 | 23.4 | 10.3 | 15.2 | 15.6 | 24.5 | 23.8 |
| Properties of | 0° tensile strength (MPa) | 2970 | 2990 | 2920 | 2890 | 3240 | 2990 | 2980 | 2860 | unmoldable |

TABLE 4-continued

|  |  | Comparative example 1 | Comparative example 2 | Comparative example 3 | Comparative example 4 | Comparative example 5 | Comparative example 6 | Comparative example 7 | Comparative example 8 | Comparative example 9 |
|---|---|---|---|---|---|---|---|---|---|---|
| composite material | 0° compression strength (MPa) | 1526 | 1554 | 1718 | 1691 | 1702 | 1708 | 1636 | 1830 | unmoldable |

TABLE 5

|  |  | Comparative example 10 | Comparative example 11 | Comparative example 12 | Comparative example 13 | Comparative example 14 | Comparative example 15 | Comparative example 16 | Comparative example 17 |
|---|---|---|---|---|---|---|---|---|---|
| Epoxy resin composition | component [A] |  |  |  |  |  |  |  |  |
|  | tetraglycidyl-4,4'-diaminobenzanilide |  |  |  |  |  |  |  |  |
|  | tetraglycidyl-3,4'-diaminobenzanilide |  |  |  |  |  |  |  |  |
|  | component [B] |  |  |  |  |  |  |  |  |
|  | bisphenol A type epoxy (jER825) | 35 | 30 | 25 | 20 | 5 | 30 | 30 | 30 |
|  | bisphenol F type epoxy (Epiclon830) |  |  |  |  |  |  |  |  |
|  | tetraglycidyl diaminodiphenyl methane (MY721) | 30 | 40 | 50 | 60 | 90 | 70 | 70 | 70 |
|  | triglycidyl-m-aminophenol (MY0600) | 35 | 30 | 25 | 20 | 5 |  |  |  |
|  | triglycidyl-p-aminophenol (MY0510) |  |  |  |  |  |  |  |  |
|  | diglycidyl-p-phenoxy aniline (Toray Epoxy PG-01) |  |  |  |  |  |  |  |  |
|  | component [C] |  |  |  |  |  |  |  |  |
|  | 4,4'-diaminobenzanilide (4,4'-DABAN) | 39 | 40 | 41 | 42 | 45 |  |  |  |
|  | 3,4'-diaminobenzanilide (3,4'-DABAN) |  |  |  |  |  | 41 |  |  |
|  | 4,4'-diaminodiphenyl sulfone (Seikacure S) |  |  |  |  |  |  | 45 |  |
|  | 3,3'-diaminodiphenyl sulfone (3,3'-DAS) |  |  |  |  |  |  |  | 45 |
|  | component [D] |  |  |  |  |  |  |  |  |
|  | polyethersulfone (Virantage VW-10700RFP) | 3 | 3 | 3 | 3 | 3 | 3 | 3 | 3 |
| Properties of cured resin | bending elastic modulus (GPa) | 3.8 | 3.8 | 3.9 | 4.0 | 4.1 | 3.8 | 3.3 | 3.6 |
|  | rubber-state elastic modulus (MPa) | 15.0 | 15.7 | 17.5 | 19.5 | 22.7 | 16.3 | 15.5 | 15.9 |
| Properties of composite material | 0° tensile strength (MPa) | 3012 | 3004 | 2985 | 2950 | 2920 | 2976 | 2955 | 2962 |
|  | 0° compression strength (MPa) | 1582 | 1592 | 1611 | 1639 | 1664 | 1585 | 1458 | 1520 |

INDUSTRIAL APPLICABILITY

The epoxy resin composition according to the present invention can give carbon fiber reinforced composite material that is high in tensile strength and compression strength and particularly suitable for manufacturing structural members. Their preferred applications in the aerospace industry include, for instance, primary structural members of aircraft such as main wing, tail unit, and floor beam; secondary structural members such as flap, aileron, cowl, fairing, and other interior materials; and structural members of artificial satellites such as rocket motor case. Furthermore, the general industrial applications include structural members of vehicles such as automobile, ship, and railroad vehicle; and civil engineering and construction materials such as drive shaft, plate spring, windmill blade, pressure vessel, flywheel, roller for paper manufacture, roofing material, cable, reinforcing bar, and mending/reinforcing materials. Applications in the sporting goods industry include golf shaft, fishing pole, rackets for tennis, badminton, squash, etc., hockey stick, and skiing pole.

The invention claimed is:
1. An epoxy resin composition comprising at least the following components [A], [B], [C] and [D]:

[A] epoxy resin having a structure as represented by chemical formula (1) in an amount of 40 to 90 mass % based on 100 mass % of the epoxy resin in the epoxy resin composition,

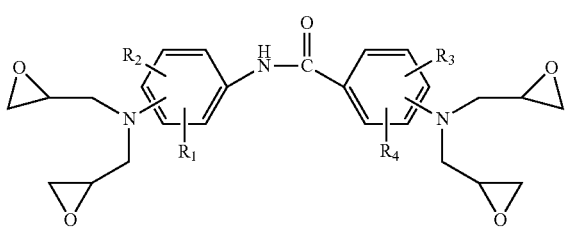

(1)

wherein $R_1$ to $R_4$ represent at least one selected from the group consisting of a hydrogen atom, aliphatic hydrocarbon group containing 1 to 4 carbon atoms, alicyclic hydrocarbon group containing 4 or less carbon atoms, and halogen atom,

[B] epoxy resin having at least one amine type glycidyl group or ether type glycidyl group and being liquid at 40° C. in an amount of 10 to 60 mass % based on 100 mass % of the epoxy resin in the epoxy resin composition,

[C] curing agent, and

[D] thermoplastic resin soluble in epoxy resin.

2. An epoxy resin composition as described in claim 1, wherein curing agent [C] is an aromatic amine curing agent.

3. An epoxy resin composition as described in claim 2, wherein component [A] is tetraglycidyl diaminobenzanilide.

4. An epoxy resin composition as described in claim 2, wherein curing agent [C] is diaminobenzanilide.

5. An epoxy resin composition as described in claim 1, wherein component [A] is tetraglycidyl diaminobenzanilide.

6. An epoxy resin composition as described in claim 5, wherein curing agent [C] is diaminobenzanilide.

7. An epoxy resin composition as described in claim 1, wherein curing agent [C] is diaminobenzanilide.

8. An epoxy resin composition as described in claim 1, wherein cured epoxy resin produced by the curing thereof at 180° C. for 2 hours has a flexural modulus of 4.5 GPa or more and 5.7 GPa or less and a rubber-state elastic modulus of 9.5 MPa or more and 23 MPa or less.

9. An epoxy resin composition as described in claim 1 further comprising thermoplastic resin particles [E].

10. An epoxy resin composition as described in claim 1, wherein thermoplastic resin [D] is present in an amount of 1 to 40 parts by mass relative to 100 parts by mass of the epoxy resin.

11. Prepreg produced by impregnating carbon fiber with an epoxy resin composition as described in claim 1.

12. Prepreg as described in claim 11, wherein the carbon fiber has a tensile strength of 4.0 GPa to 7.5 GPa.

13. Carbon fiber reinforced composite material produced by curing prepreg as described in either claim 11.

14. Carbon fiber reinforced composite material comprising cured resin produced by curing an epoxy resin composition as described in claim 1 and carbon fiber.

* * * * *